(12) United States Patent
Wang et al.

(10) Patent No.: US 12,216,195 B2
(45) Date of Patent: Feb. 4, 2025

(54) RADAR-CAMERA DETECTION SYSTEM AND METHODS

(71) Applicant: Ainstein AI, Inc, Lawrence, KS (US)

(72) Inventors: Zongbo Wang, Lawrence, KS (US); Syed Ahmed, Lawrence, KS (US); David Royer, Lawrence, KS (US)

(73) Assignee: Ainstein AI, Inc., Lawrence, KS (US)

( * ) Notice: Subject to any disclaimer, the term of this patent is extended or adjusted under 35 U.S.C. 154(b) by 641 days.

(21) Appl. No.: 16/736,743

(22) Filed: Jan. 7, 2020

(65) Prior Publication Data

US 2020/0217948 A1    Jul. 9, 2020

Related U.S. Application Data

(60) Provisional application No. 62/789,118, filed on Jan. 7, 2019.

(51) Int. Cl.
| | |
|---|---|
| *G01S 13/86* | (2006.01) |
| *G01S 13/42* | (2006.01) |
| *G01S 13/58* | (2006.01) |
| *H04N 5/225* | (2006.01) |
| *H04N 23/58* | (2023.01) |

(52) U.S. Cl.
CPC ............ *G01S 13/867* (2013.01); *G01S 13/42* (2013.01); *G01S 13/581* (2013.01); *H04N 23/58* (2023.01)

(58) Field of Classification Search
CPC ...... G01S 13/867; G01S 13/581; G01S 13/89; H04N 5/2259
USPC .......................................................... 342/66
See application file for complete search history.

(56) References Cited

U.S. PATENT DOCUMENTS

| | | | |
|---|---|---|---|
| 6,377,204 B1 * | 4/2002 | Wurman ............... | G01S 13/003 342/75 |
| 7,474,254 B2 * | 1/2009 | White ................... | G01S 13/867 343/781 R |

(Continued)

FOREIGN PATENT DOCUMENTS

| | | | | |
|---|---|---|---|---|
| CN | 103308058 A | * | 9/2013 | ........... G01S 13/726 |
| DE | 202012103986 U1 | * | 1/2013 | ........... G01S 13/867 |
| KR | 20180097004 A | * | 2/2017 | |

OTHER PUBLICATIONS

A. F. Scannapieco, A. Renga, G. Fasano and A. Moccia, "Ultralight radar sensor for autonomous operations by micro-UAS," 2016 International Conference on Unmanned Aircraft Systems (ICUAS), 2016, pp. 727-735, doi: 10.1109/ICUAS.2016.7502664. (Year: 2016).*

*Primary Examiner* — Vladimir Magloire
*Assistant Examiner* — Michael W Justice
(74) *Attorney, Agent, or Firm* — AVEK IP, LLC; Jorge Maranto; Justin Poplin

(57) ABSTRACT

An object detection system for use in residential or commercial buildings includes a housing for retaining a camera, a radar antenna, and an actuator. The camera has a first field of view, and the radar antenna has a second field of view. The actuator is configured to selectively move the camera. The system further includes computer memory and a processor in data communication with the camera, the radar antenna, the actuator, and the computer memory. The processor, using programming contained in the computer memory, causes the camera to move based on camera position data and data from the radar antenna.

13 Claims, 8 Drawing Sheets

(56) References Cited

U.S. PATENT DOCUMENTS

| | | | | |
|---|---|---|---|---|
| 8,026,842 B2* | 9/2011 | Fox | G01S 13/522 | 342/55 |
| 8,026,844 B2* | 9/2011 | Fox | G01S 13/867 | 342/195 |
| 8,330,647 B2* | 12/2012 | Fox | G01S 13/723 | 342/28 |
| 8,704,887 B2* | 4/2014 | Zeng | G06V 20/58 | 382/104 |
| 9,030,351 B2* | 5/2015 | Fox | G01S 13/723 | 342/28 |
| 9,033,092 B1* | 5/2015 | Rao | B60R 21/38 | 180/274 |
| 9,063,230 B2* | 6/2015 | Alland | G01S 7/025 | |
| 9,293,812 B2* | 3/2016 | Shi | H01Q 9/0435 | |
| 9,671,493 B1* | 6/2017 | Khosla | G01S 13/66 | |
| 9,690,993 B2* | 6/2017 | Grewe | G06V 20/56 | |
| 9,696,409 B2* | 7/2017 | Fox | G01S 13/522 | |
| 9,720,078 B2* | 8/2017 | Fox | G01S 13/89 | |
| 9,778,351 B1* | 10/2017 | Khosla | H04N 23/698 | |
| 9,857,463 B2* | 1/2018 | Nogueira-Nine | G01S 13/343 | |
| 10,101,745 B1* | 10/2018 | Sun | G08G 1/163 | |
| 10,157,524 B2* | 12/2018 | Blech | G08B 13/19619 | |
| 10,222,824 B2* | 3/2019 | Quiet | G06F 3/1423 | |
| 10,444,346 B2* | 10/2019 | Voorheis | G01S 13/66 | |
| 10,451,723 B2* | 10/2019 | Chiu | G01S 7/354 | |
| 10,513,260 B2* | 12/2019 | Cheng | B60W 30/0956 | |
| 10,599,150 B2* | 3/2020 | Graham | G06V 20/56 | |
| 10,620,304 B2* | 4/2020 | Halbert | G01S 7/003 | |
| 10,622,694 B2* | 4/2020 | Haroun | G01S 7/032 | |
| 10,663,571 B2* | 5/2020 | Halbert | G01S 13/003 | |
| 10,677,894 B2* | 6/2020 | Wodrich | G01S 13/931 | |
| 10,721,384 B2* | 7/2020 | Schwager | H04N 23/72 | |
| 10,739,784 B2* | 8/2020 | Niesen | G05D 1/0246 | |
| 10,783,760 B2* | 9/2020 | Blech | G08B 13/19619 | |
| 10,829,122 B2* | 11/2020 | Parikh | G01S 13/862 | |
| 10,852,419 B2* | 12/2020 | Zhong | B60R 11/04 | |
| 10,860,869 B2* | 12/2020 | Dagan | G06V 20/58 | |
| 10,902,630 B2* | 1/2021 | Colosimo | G01S 11/12 | |
| 10,928,498 B1* | 2/2021 | Li | H04W 64/00 | |
| 10,963,462 B2* | 3/2021 | Sun | G06F 16/2455 | |
| 11,061,132 B2* | 7/2021 | Kirsch | G06T 7/80 | |
| 11,087,610 B2* | 8/2021 | Anderholm | G06V 20/40 | |
| 11,125,873 B1* | 9/2021 | Robertson | G01S 7/2813 | |
| 11,249,184 B2* | 2/2022 | Tingley | G01S 13/865 | |
| 2008/0169963 A1* | 7/2008 | White | G01S 7/22 | 342/357.53 |
| 2009/0015460 A1* | 1/2009 | Fox | G01S 13/867 | 342/53 |
| 2010/0169007 A1* | 7/2010 | Kaushik | G08G 1/09623 | 701/532 |
| 2010/0283662 A1* | 11/2010 | Fox | G01S 13/522 | 342/52 |
| 2011/0001657 A1* | 1/2011 | Fox | G01S 13/522 | 342/107 |
| 2012/0140061 A1* | 6/2012 | Zeng | G01S 13/726 | 348/148 |
| 2014/0062757 A1* | 3/2014 | Fox | G01S 13/867 | 342/52 |
| 2014/0118179 A1* | 5/2014 | Alland | G01S 13/867 | 342/22 |
| 2014/0247181 A1* | 9/2014 | Nogueira-Nine | G01S 13/343 | 342/128 |
| 2015/0085119 A1* | 3/2015 | Dagan | G06V 20/58 | 348/148 |
| 2015/0123838 A1* | 5/2015 | Shi | G01S 13/867 | 342/70 |
| 2015/0136513 A1* | 5/2015 | Rao | B60R 21/38 | 180/274 |
| 2015/0324002 A1* | 11/2015 | Quiet | H04N 7/142 | 463/31 |
| 2015/0324649 A1* | 11/2015 | Grewe | G06V 20/588 | 382/104 |
| 2016/0097839 A1* | 4/2016 | Fox | G01S 13/723 | 342/52 |
| 2016/0125713 A1* | 5/2016 | Blech | G08B 13/187 | 348/143 |
| 2016/0240907 A1* | 8/2016 | Haroun | G01S 13/931 | |
| 2017/0031013 A1* | 2/2017 | Halbert | G01S 7/414 | |
| 2017/0059692 A1* | 3/2017 | Laufer | G01S 13/878 | |
| 2017/0187119 A1* | 6/2017 | Kirino | H01Q 1/2291 | |
| 2017/0205506 A1* | 7/2017 | Voorheis | G01S 13/66 | |
| 2017/0285158 A1* | 10/2017 | Halbert | G01S 7/414 | |
| 2018/0087907 A1* | 3/2018 | DeBitetto | G01S 19/46 | |
| 2018/0088214 A1* | 3/2018 | O'Keeffe | G01S 7/4815 | |
| 2018/0089538 A1* | 3/2018 | Graham | G06V 20/56 | |
| 2018/0172816 A1* | 6/2018 | Chiu | G01S 13/26 | |
| 2018/0314247 A1* | 11/2018 | Sun | B60W 30/00 | |
| 2019/0009777 A1* | 1/2019 | Cheng | G06T 7/246 | |
| 2019/0096205 A1* | 3/2019 | Blech | G08B 13/19695 | |
| 2019/0096220 A1* | 3/2019 | Anderholm | G08B 21/0476 | |
| 2019/0120934 A1* | 4/2019 | Slutsky | G01S 13/931 | |
| 2019/0120955 A1* | 4/2019 | Zhong | G01S 13/931 | |
| 2019/0135292 A1* | 5/2019 | Parikh | B60W 30/18163 | |
| 2019/0163198 A1* | 5/2019 | Niesen | G01C 21/1652 | |
| 2019/0220462 A1* | 7/2019 | Sun | G06F 16/2455 | |
| 2019/0236955 A1* | 8/2019 | Hu | G08G 1/096741 | |
| 2019/0271550 A1* | 9/2019 | Breed | G01C 21/3848 | |
| 2019/0304116 A1* | 10/2019 | Price | G06F 3/011 | |
| 2019/0353775 A1* | 11/2019 | Kirsch | G01S 7/4004 | |
| 2020/0211215 A1* | 7/2020 | Colosimo | G01S 11/12 | |
| 2020/0355823 A1* | 11/2020 | Tingley | G01S 13/931 | |
| 2021/0041555 A1* | 2/2021 | Zhong | G01S 13/931 | |
| 2021/0318426 A1* | 10/2021 | Kirsch | G01S 13/867 | |

* cited by examiner

RADAR-CAMERA DETECTION SYSTEM AND METHODS

CROSS-REFERENCE TO RELATED APPLICATIONS

This application claims the benefit of priority of U.S. Provisional Patent Application No. 62/789,118, filed Jan. 7, 2019, the disclosure of which is incorporated herein by reference in its entirety.

FIELD OF THE DISCLOSURE

The disclosure relates generally to the field of object detection. More specifically, the disclosure relates to object detection using combined camera and radar methods.

SUMMARY

The following presents a simplified summary of the invention in order to provide a basic understanding of some aspects of the invention. This summary is not an extensive overview of the invention. It is not intended to identify critical elements of the invention, or to delineate the scope of the invention. Its sole purpose is to present some concepts of the invention in a simplified form as a prelude to the more detailed description that is presented elsewhere herein.

According to one embodiment, an object detection system for use in residential or commercial buildings includes a housing for retaining a camera, a radar antenna, and an actuator. The camera has a first field of view, and the radar antenna has a second field of view. The actuator is configured to selectively move the camera. The system further includes computer memory and a processor in data communication with the camera, the radar antenna, the actuator, and the computer memory. The processor, using programming contained in the computer memory, causes the camera to move based on camera position data and data from the radar antenna.

According to another embodiment, a method of detecting an object includes first providing an object detecting system. The object detection system has a camera module comprising a camera, a radar module comprising a radar sensor, and a computing system operatively coupled to the camera module and the radar module. The method continues by determining a motion detection based on an image from the camera; determining a motion detection based on a radar reflection from the radar sensor; providing, via the computing system, an image object list from the camera module; providing, via the computing system, a radar object list from the radar module; comparing the image object list and the radar object list; providing, via the computing system, a final object list based on the comparison of the image object list and the radar object list; and outputting a system response based on the final object list.

According to still another embodiment, an object detection system for use in residential or commercial buildings has a camera with a first field of view, a radar antenna with a second field of view, an actuator configured to selectively move the camera, computer memory, and a processor in data communication with the camera, the radar antenna, the actuator, and the computer memory. The processor, using programming contained in the computer memory, causes the camera to move based on data from the radar antenna.

BRIEF DESCRIPTION OF THE SEVERAL VIEWS OF THE DRAWINGS

Illustrative embodiments of the disclosure are described in detail below with reference to the attached figures.

DETAILED DESCRIPTION

Figure 1:
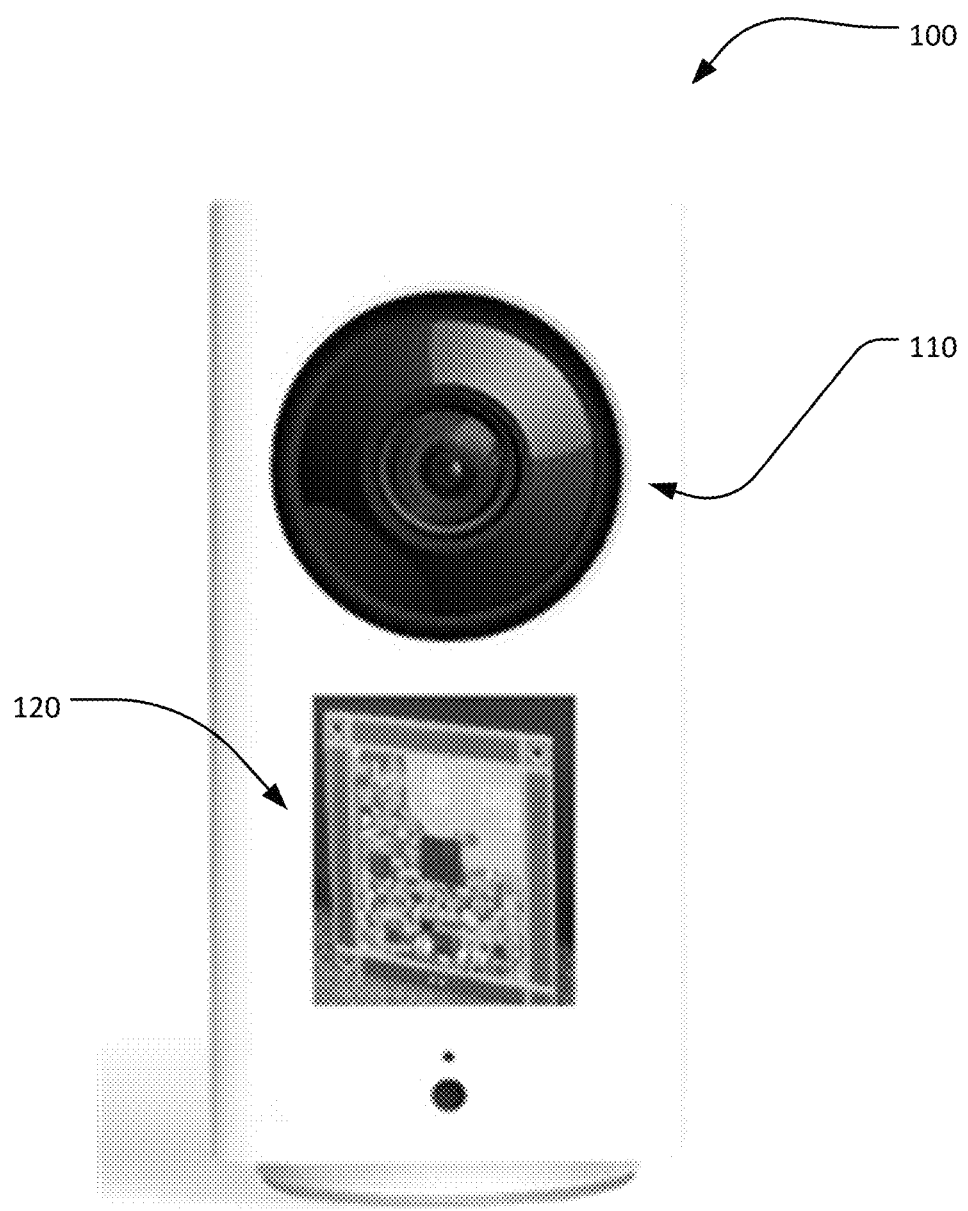
FIG. 1 is a front view of a radar-camera detection system, according to an embodiment of the disclosure.

Camera-based sensors are capable of motion detection utilizing imaging processing; however, such camera-based sensors are sensitive to lighting conditions and tend to give off higher rates of false-alarms. Likewise, radar-based sensors are capable of detecting moving objects, but lack details that would be useful. To remedy these, and other, drawbacks, a fixed camera and radar integrated sensor having unique and novel integration methods, mechanical structures, signal processing, and connectivity features is described herein.

FIGS. 1 through 7 illustrate an embodiment 100 of a radar-camera detection system 100, which broadly includes a camera module 110, a radar module 120, and a computing system 130. In use, the radar-camera detection system 100 may employ the camera module 110 and the radar module 120 in concert to more effectively detect an object than if the modules 110 and 120 were used on their own. For example, some environments with low light conditions may restrict the effectiveness of visual detection systems (e.g., camera module 110), but the radar module 120 may be relatively unaffected by the low light conditions. The radar module 120 may be used to supplement the detection ability of the camera module 110, thereby increasing the detection effectiveness of the system 100. In another example, the radar module 120 may detect an object, but may lack the components necessary to adequately record the detected object. The camera module 110 may then provide an adequate recording of the detected object via a visual sensor (e.g., a video camera).

Figure 2:
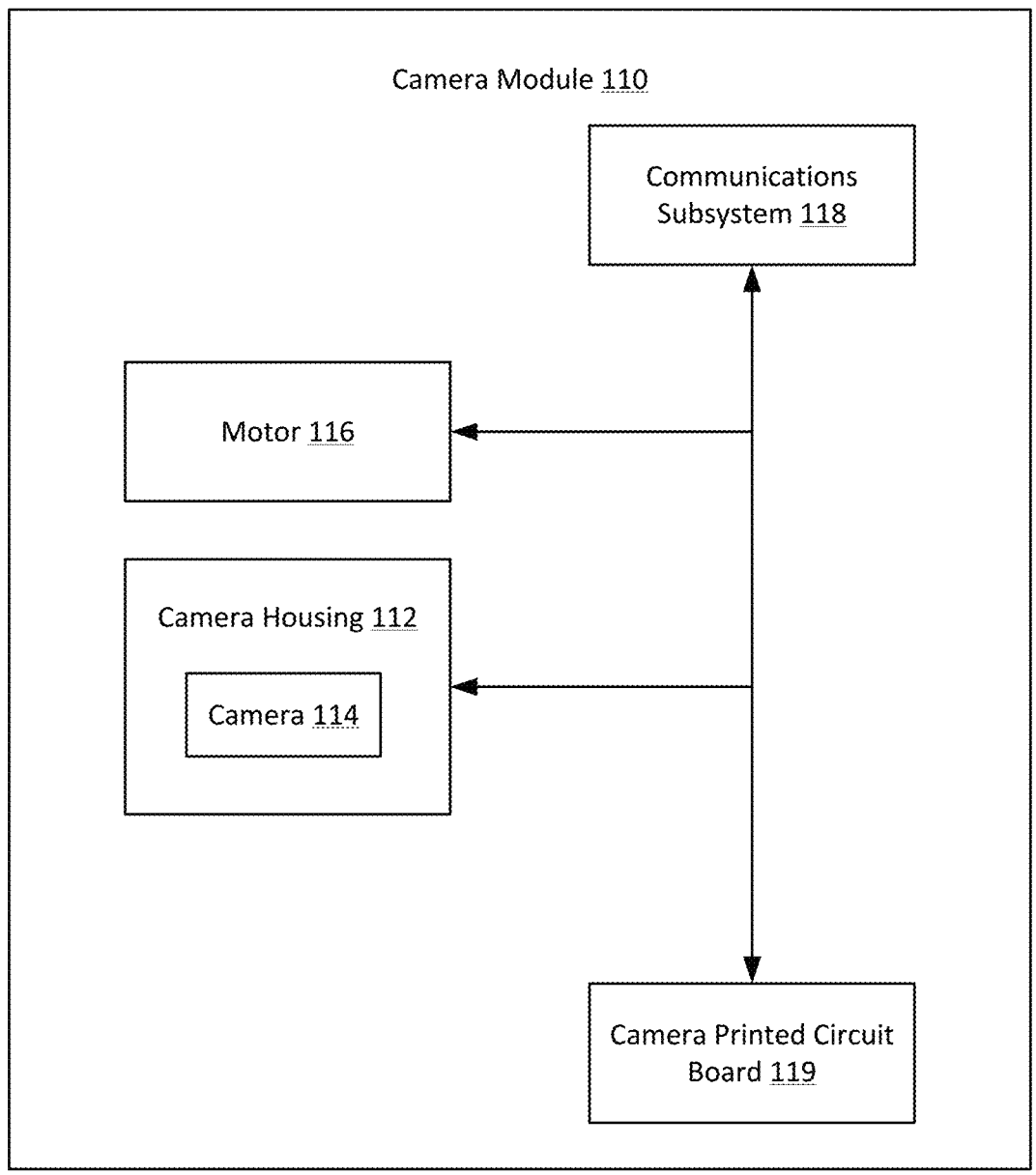
FIG. 2 is a functional block diagram of a camera module of the radar-camera detection system of FIG. 1.

The camera module 110 of the radar-camera detection system 100 may include a camera housing 112, a camera 114, a motor 116, a communication subsystem 118, and a camera printed circuit board 119, as seen in FIG. 2. In operation, the camera module 110 may detect objects, and in embodiments, record videographic and/or pictographic information regarding the detected object and environmental conditions associated with the detected object (i.e., an object detection event). For example, the radar-camera detection system 100 may be used for security applications, and the camera module 110 may detect and/or record objects (e.g., persons) in a given area.

The camera housing 112 may be a suitable protective container or cover configured to fit at least one or more other components of the camera module 110 (e.g., the camera 114, the motor 116, the camera printed circuit board 119, et cetera). In embodiments, the camera housing 112 may have a construction that may withstand outdoor conditions (e.g., have components that make the camera housing 112 water resistant or water proof, have components designed to protect against weather, et cetera). In use, the camera housing 112 may contain or otherwise protect the other components of the camera module 110.

The camera 114 may be a suitable camera device for detection and recording purposes (e.g., optical, infrared, et cetera). In embodiments, the camera 114 may be configured to respond to object motion. For example, the camera 114 may be configured to recognize motion from a person or other object within a field of view (FOV) of the camera 114. Alternately or additionally, the camera 114 may respond to object motion by recording the object detection event. The camera 114 may use other components of the radar-camera detection system 100 (e.g., the camera printed circuit board 119, the computing system 130, etc.) to enact image processing. For example, the camera 114 may use an algorithm stored in the computing system 130 to declutter the visual feed of the camera 114, for better object detection.

The camera module 110 may use the motor 116 to reposition the camera 114. In operation, the motor 116 may assist the camera 114 in object detection. For example, the motor 116 may reposition the camera 114 in a pattern, such as a scanning mode where the camera 114 moves its field of vision repeatedly through a given area. Alternately or additionally, the motor 116 may be configured to move the camera 114 in response to an object detection event, such as by moving the camera 114 in a manner which keeps the detected object in the field of view of the camera 114 (i.e., the motor 116 may help the camera 114 track the motion of the detected object).

The communications subsystem 118 of the camera module 110 may be configured to communicatively couple components of the camera module 110 to other components of the radar-camera detection system 100. For example, the communications subsystem 118 may communicatively couple the motor 116 and the camera 114, to enable the motor 116 to respond to detections made by the camera 114. Alternately or additionally, the communications subsystem 118 may communicatively link the camera module 110 to the radar module 120.

The camera printed circuit board 119 may have circuitry (e.g., wires, flexible cables, and other electrical components) configured to operably couple the components of the camera module 110 together. In embodiments, the camera printed circuit board 119 may also be configured to operably couple the camera module 110 to other devices, such as a power supply and/or the computing system 130. In some embodiments, the camera printed circuit board 119 may be constructed using through-hole technology, the camera printed circuit board 119 substrate may be a dielectric composite material (e.g., FR-4 material), and/or the camera printed circuit board 119 RF layer may be constructed of a low dielectric constant material.

Figure 3:
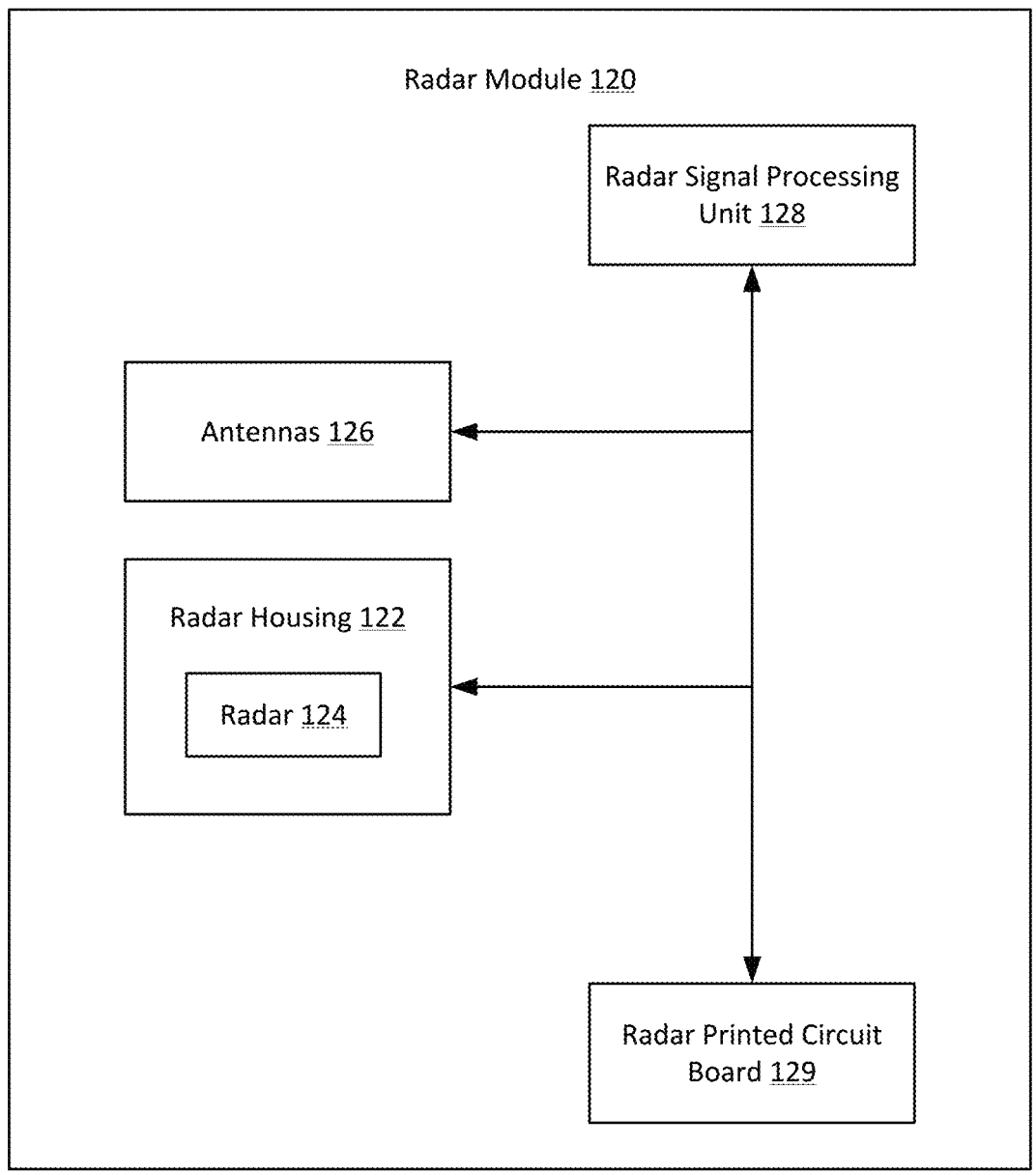
FIG. 3 is a functional block diagram of a radar module of the radar-camera detection system of FIG. 1.

The radar module 120 of the radar-camera detection system 100 may include a radar housing 122, a radar 124, one or more antennas 126, a signal processing unit 128, and a radar printed circuit board 129, as seen in FIG. 3. In use, the radar module 120 may supplement the object detection capability of the radar-camera detection system 100. For example, the radar module 120 may detect object motion by bouncing radio frequency electromagnetic signals (i.e., radio signals) off of objects and analyzing the returned signal to detect the objects and their object motion.

The radar housing 122 may be a suitable protective container or cover configured to house at least one or more other components of the radar module 120 (e.g., the radar 124, the antennas 126, the radar printed circuit board 129, et cetera). In some embodiments, the radar housing 122 may have a construction that may withstand outdoor conditions (e.g., have components that make the radar housing 122 water resistant or water proof, have components designed to protect against weather, et cetera). In use, the radar housing 122 may contain or otherwise protect the other components of the radar module 120. In some embodiments, the radar housing 122 may be attached to or formed as part of the camera housing 112. The radar housing 122 may be at least partly constructed of a radome material (e.g., fiberglass, polytetrafluoroethylene, etc.) that may minimally restrict the passage of radio signals while protecting the radar 124 and the antennas 126 from environmental conditions.

The radar 124 may be any suitable radio frequency electromagnetic signal emitting device for the detection of objects and/or object motion. For example, the radar 124 may use one or more of the antennas 126 for transmitting a radio signal for object detection, and the radar 124 may be configured to respond to object motion. For example, the radar 124 may be configured to recognize motion from a person or other object within the range, or field of view, of the radar 124. Alternately or additionally, the radar 124 may respond to object motion by recording the object detection event. The radar 124 may use other components of the radar-camera detection system 100 (e.g., the radar printed circuit board 129, the computing system 130, the radio signal processing unit 128, etc.) to enact radio signal processing (e.g., doppler processing). For example, the radar 124 may use the radio signal processing unit 128 to declutter the radio signal returns of the radar 124 for better object detection.

The use of multiple-input-multiple-output (MIMO) radar technology may allow the system 100 to track multiple targets in azimuth and elevation planes. In some embodiments, the radar 124 uses frequency modulated continuous wave (FMCW) technology to continuously send and receive radio signals for the detection of objects and object motion. The radar 124 may be able to distinguish and track multiple targets in 3-dimensions through the use of the FMCW technology. Specific radio wave frequency ranges (e.g., a 60 GHz frequency band with 4 GHz bandwidth) may be used to improve the effectiveness of the radar 124, and may thus allow for better resolution in mapping of the 3-dimensional environment.

Figure 4:
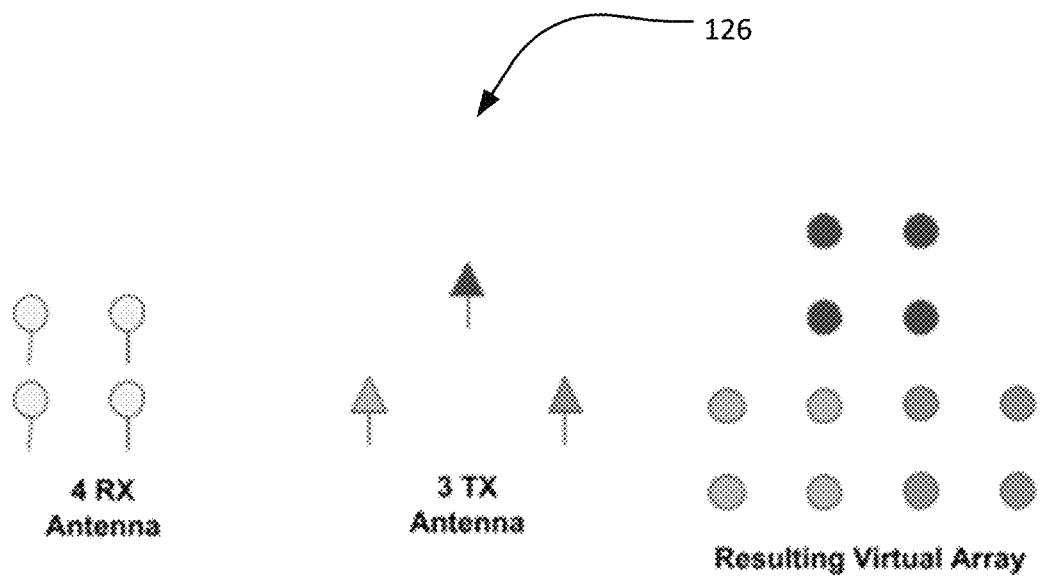
FIG. 4 is a schematic view of an array of antennas of the radar-camera detection system of FIG. 1.

The radar module 120 may use one or more antennas 126 to send and receive the radio signals of the radar 124. The antennas 126 may be configured to both send and receive radio signals. Alternately or additionally, one or more of the antennas 126 may be configured to transmit radio signals, while one or more of the antennas 126 may be configured to receive radio signals. The resolution and accuracy in mapping of the 3D environment may be further improved through the placement and design of the antennas 126. Accordingly, the antennas 126 may be arranged in a formation configured to improve the resolution and accuracy of the radar 124. For example, as seen in FIG. 4, there may be four antennas 126 configured to receive radio signals disposed around each of three antennas 126 configured to transmit radio signals, resulting in an antenna 126 virtual array.

The antennas 126 may be designed with a wide field of view (FOV) in both azimuth and elevation plane. Accordingly, the system 100 may be placed in many different indoor or outdoor locations without affecting the detection of targets. However, use of a radar indoors, such as radar 124, can result in a considerable amount of clutter. As described in greater detail below, clutter removal algorithms, together with doppler processing, maybe utilized to detect small targets and help distinguish between targets and clutter. Notably, lighting conditions and environmental conditions such as dust, temperature, etc. does not affect the detection of targets via the radar 124.

In some embodiments, the azimuth FOV for the camera 114 and the antenna 126 may be, for example, 120° and 160°, respectively. The elevation FOV for the camera 114 and the antenna 126 may be, for example, 93° and 160°, respectively.

Figure 5:
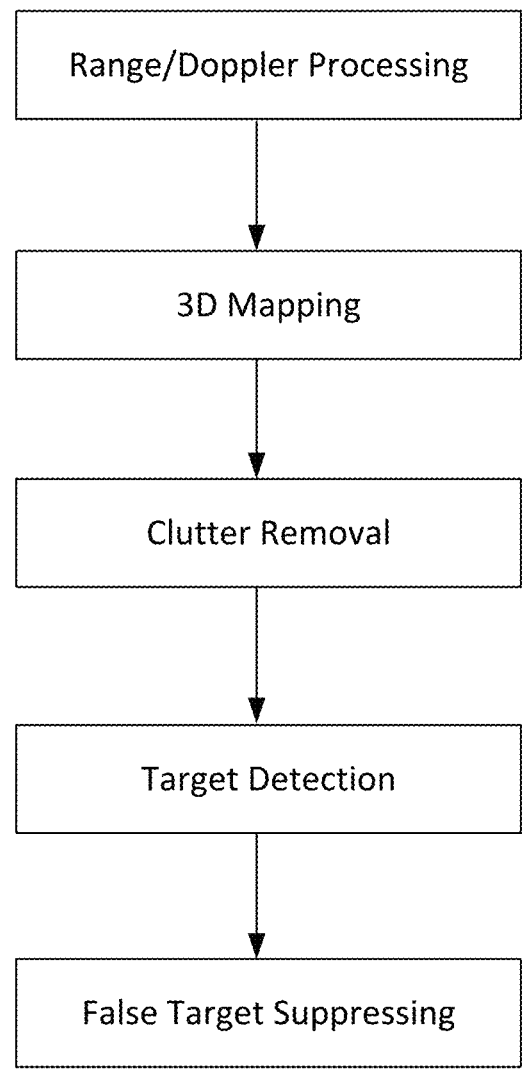
FIG. 5 is a flowchart depicting a method of clutter removal for detecting targets via the radar-camera detection system of FIG. 1.

The radar signal processing unit 128 may improve the effectiveness of the radar 124 by using algorithms, or other signal processing techniques, to condition the received radio signals. For example, the radar signal processing unit 128 may declutter the received radio signal of undesirable detected objects, suppress false targets detected, map out the three-dimensional environment of the radar-camera detection system 100, or otherwise improve target object detection. FIG. 5 is a flowchart illustrating an exemplary series of steps undertaken by a clutter removal algorithm. As described therein, the algorithm includes receiving data from at least the radar 124, creating a 3D map, removing clutter, detecting a target, and suppressing false targets.

The radar printed circuit board 129 may have circuitry (e.g., wires, flexible cables, and other electrical components) configured to operably couple the components of the radar module 120 together. In some embodiments, the radar printed circuit board 129 may also be configured to operably couple the radar module 120 to other devices, such as a power supply and/or the computing system 130. The radar printed circuit board 129 may operably couple the radar module 120 to the camera module 110 for communication therebetween. For example, the radar module 120 may detect an object, which may sometimes be undetected by the camera module 110 for various reasons (e.g., the object is outside the field of view of the camera 114, the environmental conditions prevent easy detection of the object by the camera module 110, et cetera). In response to this detection, the radar module 120 may direct the camera module 110 in a manner which may assist the camera module 110 in detecting and/or recording the object (e.g., the radar module 120 may direct the motor 116 to reposition the camera 114 to place the object in the field of view of the camera 114). In some embodiments, the radar module 120 and the camera module 110 may be communicatively linked, which may allow the modules 110 and 120 to perform cross validation and object matching with their respective object detection events, which may improve their object detection effectiveness.

As is described herein, the system 100 includes two printed circuit boards: the camera printed circuit board 119 and the radar printed circuit board 129. The camera PCB 119 hosts the various components of the camera 124 (e.g., the camera lens and the image sensor). Likewise, the radar PCB 129 hosts the various components of the radar 124 and/or the camera 124 (e.g., radar antennas 126, transmitter, receiver, processor, image processor for the camera 124). The two PCBs may be integrated using flexible cables for power supply and signal transfer. A through-hole may be formed in the radar PCB 129 to receive the camera lens.

The radar printed circuit board 129 substrate may be a dielectric composite material (e.g., FR-4 material). The radar printed circuit board 129 RF layer may be constructed of a low dielectric constant material.

Figure 6:
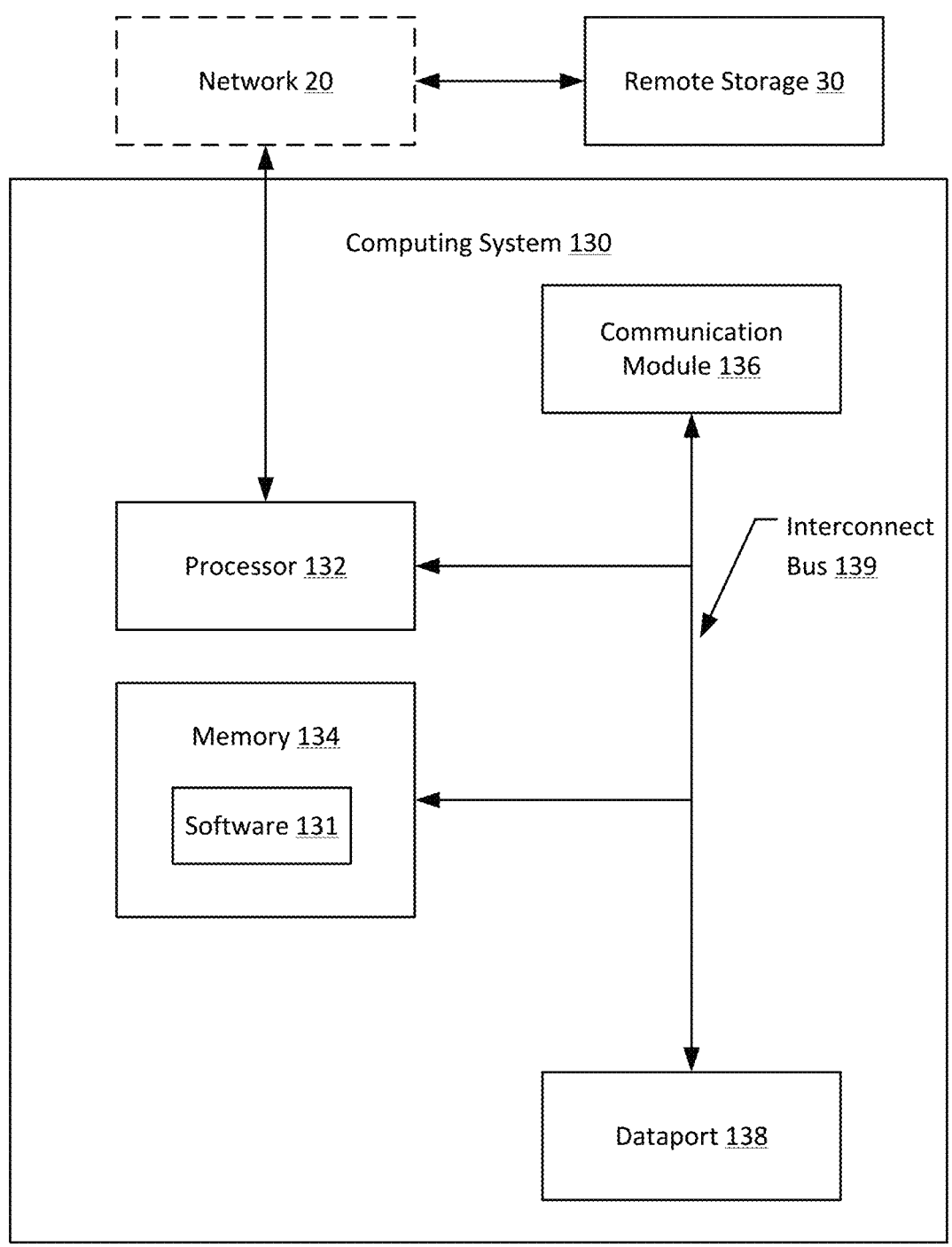
FIG. 6 is a functional block diagram of a computing system of the radar-camera detection system of FIG. 1.

Moving on, FIG. 6 is a functional block diagram of a computing system 130 which may be used to implement the various radar-camera detection system embodiments according to the different aspects of the present disclosure. The computing system 130 may be, for example, a smartphone, a laptop computer, a desktop computer, a flexible circuit board, or other computing device whether now known or subsequently developed.

The computing system 130 includes a processor 132, a memory 134, a communication module 136, and a dataport 138. These components may be communicatively coupled together, for example, by an interconnect bus 139. The processor 132 may include any processor used in desktop computers and/or other computing devices, including an analog processor (e.g., a Nano carbon-based processor), or any other suitable processing element. In certain embodiments, the processor 132 may include one or more other processors, such as within the camera printed circuit board 119 and the radar printed circuit board 129, one or more microprocessors, and/or one or more supplementary co-processors, such as math co-processors. In some embodiments, at least one processor 132 may alternatively or additionally be disposed remotely (e.g., connected via a wired connection, connected via a wireless connection, connected through a network 20) to other components of the computing system 130 (e.g., the memory 134, the communication module 136, et cetera).

The memory 134 may include operating memory, such as random access memory (RAM), data storage memory, such as read-only memory (ROM), hard drives, optical, flash memory, or any other suitable memory/storage element. The memory 134 may include removable memory elements, such as a CompactFlash card, a MultiMediaCard (MMC), and/or a Secure Digital (SD) card. In certain embodiments, the memory 134 includes a combination of magnetic, optical, and/or semiconductor memory, and may include, for example, RAM, ROM, flash drive, and/or a hard disk or drive. The processor 132 and the memory 134 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium (e.g., the network 20) or combinations of the foregoing. For example, the processor 132 may be connected to the memory 134 via the dataport 138.

The communication module 136 may be configured to handle communication links between the computing system 130 and other external devices or receivers, and to route incoming/outgoing data appropriately. For example, inbound data from the dataport 138 may be routed through the communication module 136 before being directed to the processor 132, and outbound data from the processor 132 may be routed through the communication module 136 before being directed to the dataport 138. The communication module 136 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology. In some embodiments, the communication module may route incoming/outgoing data through the network 20.

The dataport 138 may be any type of connector used for physically interfacing with a smartphone, computer, and/or other devices, such as a USB port, a mini-USB port, an IPHONE®/IPOD® 30-pin connector or LIGHTNING® connector, an input device (e.g., touch screen, keyboard and mouse, et cetera), or other similar device. In some embodiments, the dataport 138 is connected to a user interface, which may be configured to display information such as a graphical user interface, the object detection events recognized by the modules 110 and 120, and/or recordings of the object detection events by the modules 110 and 120. In other embodiments, the dataport 138 may include multiple communication channels for simultaneous communication with, for example, other processors, servers, and/or client terminals.

The memory 134 may store instructions for communicating with other systems, such as a computer or a remote storage 30. The memory 134 may store, for example, a program (e.g., computer program code) adapted to direct the processor 132 in accordance with the present embodiments. The instructions also may include program elements, such as an operating system. While execution of sequences of instructions in the program causes the processor 132 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

In some embodiments, the memory 134 may include software 131. The software 131 may contain machine readable instructions configured to be executed by the processor 132. The software 131 may, for example, contain instructions to execute the method 140, and the software 131 may cause the computing system 130 to dynamically respond to data obtained from the camera module 110 and/or the radar module 120. For example, the software 131 may receive a determination from the radar module 120 that an object is detected and that the camera module 110 has not detected the object (e.g., because the object is outside the field of view of the camera module 110 but within the field of view of the radar module 120). The software 131 may then respond to such a determination by directing the motor 116 to move the camera 114 of the camera module 110 in a manner such that the object detected by the radar module 120 is disposed within the field of vision of the camera module 110 for detection by the camera module 110.

The software 131 may direct the radar-camera detection system 100 to record information associated with the object detection event (i.e., when an object is detected by one or more modules of the radar-camera detection system 100). For example, the radar-camera detection system 100 may record: the time and date of the object detection event, the location of the radar-camera detection system 100 that had the object detection event, the position of the object that caused the object detection event, the ambient and/or environmental conditions (e.g., temperature, precipitation, visibility, etc.), pictographic information and/or videographic information of the object and the object detection event (e.g., via the camera 114 of the camera module 110), et cetera. In some embodiments, the recorded information may be accessed locally to the radar-camera detection system 100 (e.g., via a display interface, a computer interface, via a wired connection to the radar-camera detection system 100, et cetera). Alternately or additionally, the recorded information may be accessed remotely to the radar-camera detection system 100 (e.g., via a wireless connection, the network 20, et cetera).

In some embodiments, the software 131 of the computing system 130 may direct other systems in response to an object detection event. For example, the computing system 130 may send a command to another system to produce an alarm in response to the object detection event, the computing system 130 may send an alert to a user of the radar-camera detection system, a combination of the above described options, or any other response suitable to an object detection event now known or subsequently developed. The software 131 may help coordinate multiple radar-camera detection systems 100 that may be communicatively linked. For example, a plurality of radar-camera detection systems 100 may be employed to cover a larger given area than a single radar-camera detection system 100 may be able to cover, and the plurality of systems 100 may be communicatively linked. The software 131 may direct the systems 100, such as by directing the radar-camera detection systems 100 to move their cameras 114 to track an object that was detected by one of the systems 100. In another example multiple radar-detection systems 100 may share data collected by their respective modules 110 and 120 for performing object matching and cross validation for more effective object detections.

The computing system 130 may be in data communication with the remote storage 30 over the network 20. The network 20 may be a wired network, a wireless network, or comprise elements of both. The remote storage 30 may be, for example, the "cloud" or other remote storage in communication with other computing systems (e.g., one or more servers). In embodiments, data (e.g., object detection events, recorded information associated with the object detection events, etc.) may be stored in the remote storage 30 for analytics.

Figure 7:
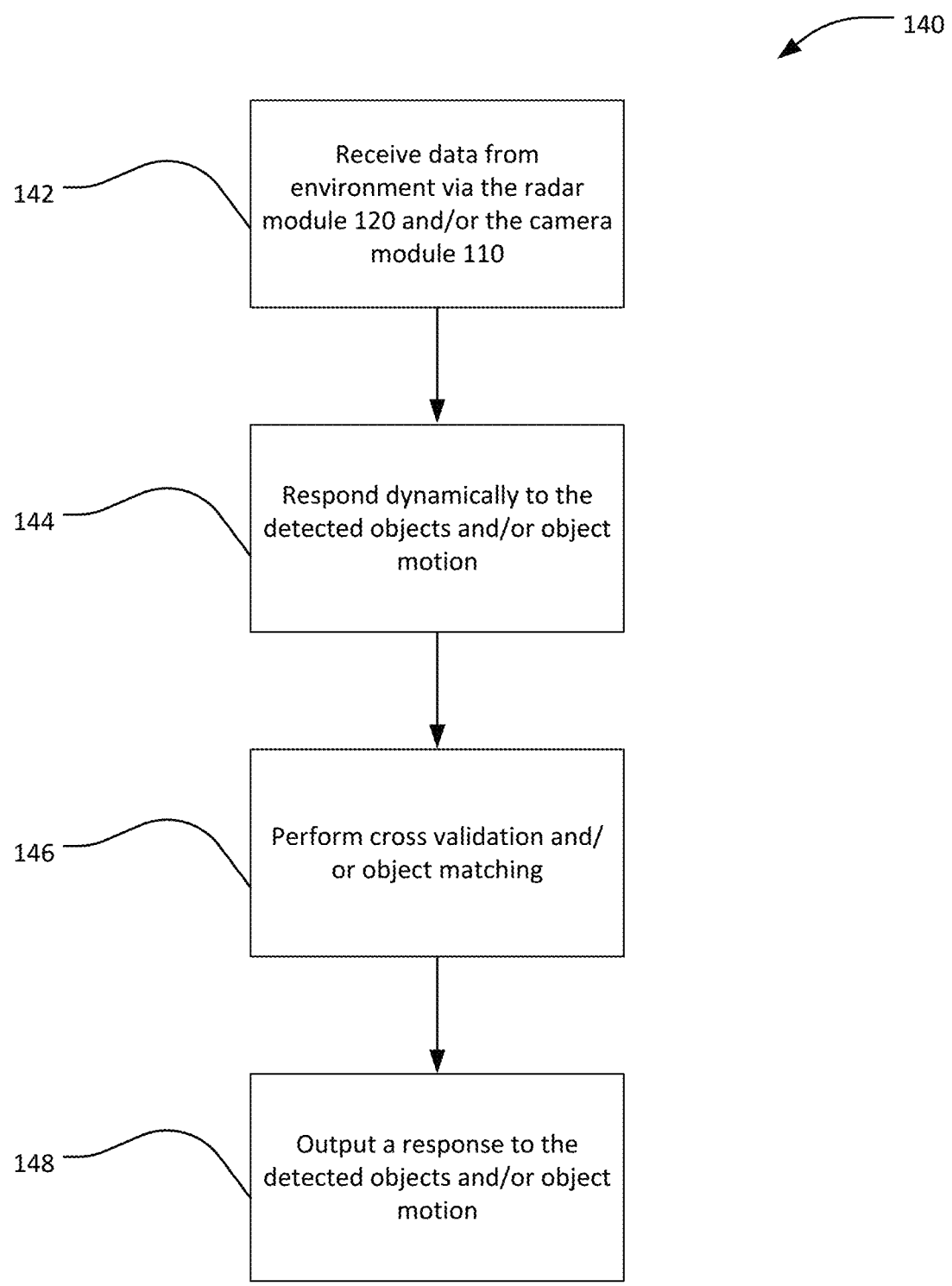
FIG. 7 is a flowchart depicting a method of operating the radar-camera detection system of FIG. 1.
Figure 8:
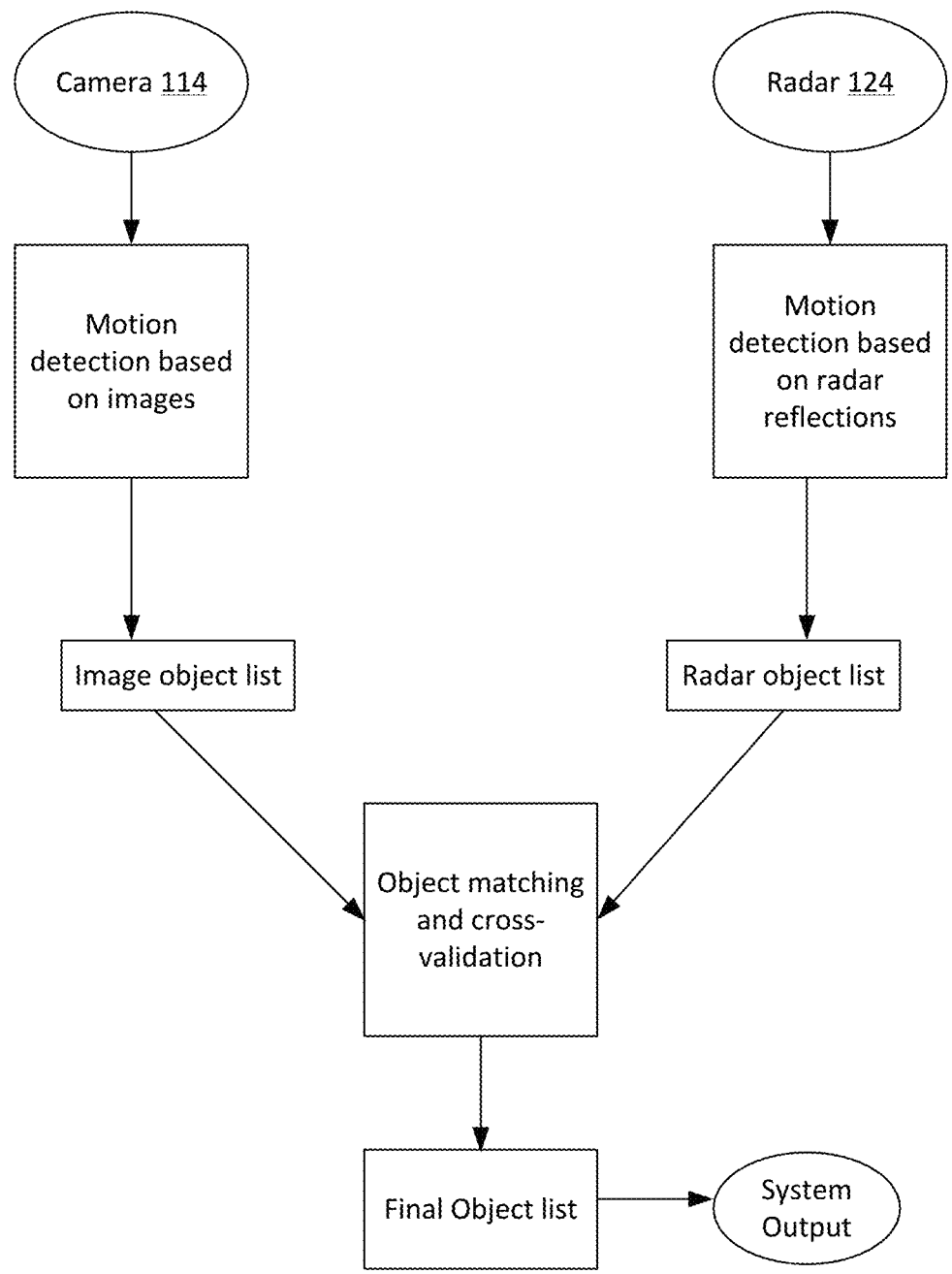
FIG. 8 is a flowchart depicting a method of operating the radar-camera detection system of FIG. 1.

FIG. 7 illustrates a method 140 of operating the radar-camera detection system 100. First, at step 142, data may be taken in by the radar-camera detection system 100. For example, the camera module 110 and/or the radar module 120 may use the camera 114 and the radar 124, respectively, to detect objects and object motion. Then, at step 144, the radar module 120 and/or the camera module 110 may dynamically respond to an object detection event. For example, as described above, the radar module 120 may direct the motor 116 of the camera module 110 in response to an object detection event. As another example, the camera module 110 and/or radar module 120 may use signal processing techniques, as described above, to improve the effectiveness of object and object motion detection. Next, at step 146, the radar module 120 and/or the camera module 110 may communicate to each other their respective object detections and/or recordings of the object detection event. In other words, the detection of an event (e.g., detection of an intruder) is processed by both image processing (i.e., via the camera module 110) and radar processing (i.e., via the radar module 120). By communicating such information between the modules 110 and 120, the camera module 110 and the radar module 120 may each individually perform object matching via separate processing approaches, and subsequently cross validate the data with each other, which may suppress false positive results or otherwise improve the effectiveness of the radar-camera detection system 100. The cross-validation process is illustrated in the flow chart in FIG. 8.

Finally, at step 148, the resulting cross-validated data may be stored (e.g., in the computing system 130, the remote storage 30, et cetera). In embodiments, the computing system 130 may direct other systems in response to the cross-validated data and/or the object detection event (e.g., produce an alarm, alert a user of the radar-camera detection system 100, et cetera).

It shall be understood that any suitable combination and order of steps described in the present disclosure may be used in the method 140, and that some embodiments of the method 140 may omit, alter, and/or add steps as desired. Such considerations are fully contemplated and within the scope of the present disclosure. Further, it shall be understood that while the radar-camera detection system 100 has been described in the context of security system applications, such descriptions were used for illustrative purposes and are not intended to limit the use of the radar-camera detection system 100 to such applications.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the disclosure. Not all steps listed in the various figures need be carried out in the specific order described.

The invention claimed is:

1. A security system for use with a residential or commercial building to detect people, the security system comprising:
 a stationary housing;
 a camera contained in the housing, the camera having a first field of view inside or outside the building, wherein the first field of view comprises an azimuth field of view and an elevation field of view, wherein the azimuth field of view is greater than the elevation field of view;
 a radar module vertically aligned with the camera, the radar module having radar antennas contained in the housing, the radar antennas having a second field of view and arranged in a formation including three radar transmission antennas of the radar antennas and four radar receiving antennas around each of the three radar transmission antennas;
 an actuator configured to selectively move the camera;
 computer memory; and
 a processor in data communication with the camera, the radar antenna, the actuator, and the computer memory;
 wherein the processor, using programming contained in the computer memory, causes the actuator to move the camera based on camera position data and data from the radar antenna; and
 wherein the processor the processor, using programming contained in the computer memory, a cross validation analysis using object detection events from the camera and the radar antenna that suppresses false positive results detected in the object detection events.

2. The system of claim 1, wherein the second field of view is larger than the first field of view.

3. The system of claim 1, wherein the processor, using programming contained in the computer memory, validates the data from the radar antennas with data from the camera and outputs validated detection results.

4. The system of claim 1, wherein the processor, using programming contained in the computer memory, further initiates doppler processing of the data from the radar antennas.

5. The system of claim 1, wherein an azimuth field of view of the second field of view is about 160 degrees and an elevation field of view of the second field of view is about 160 degrees.

6. The system of claim 1, wherein the actuator is a motor configured to adjust the camera based on data from the radar antennas and camera position data.

7. The system of claim 1, wherein at least a portion of the housing comprises a radome material.

8. A method of detecting an object, comprising:
 providing an object detecting system, comprising:
  a. a camera module comprising a camera having a first field of view, wherein the first field of view comprises an azimuth field of view and an elevation field of view, wherein the azimuth field of view is greater than the elevation field of view;
  b. a radar module vertically aligned with the camera within a housing, the radar module comprising at least one receiving antenna and at least one transmitting antenna, and a radar sensor having a second field of view, the at least one receiving antenna and the at least one transmitting antenna arranged in a formation such that the receiving antenna surround the transmitting antenna, the second field of view being greater than the first field of view; and
  c. a computing system operatively coupled to the camera module and the radar module;
 determining a motion detection based on an image from the camera;
 determining a motion detection based on a radar reflection from the radar sensor;
 providing, via the computing system, an image object list from the camera module;
 providing, via the computing system, a radar object list from the radar module;
 comparing the image object list and the radar object list;
 performing a cross validation on the image object list and the radar object list that suppresses false positive results detected in the image object list and the radar object list;
 providing, via the computing system, a final object list based on the comparison of the image object list and the radar object list and the cross validation; and
 outputting a system response based on the final object list.

9. The method of claim 8, wherein the system response is an alarm.

10. The method of claim 8, wherein the second field of view comprises an azimuth field of view of about 160 degrees and an elevation field of view of about 160 degrees.

11. The method of claim 8, wherein the object detecting system further comprises a motor operatively coupled to the camera module and the radar module; and wherein the motor is configured to adjust a position of the camera based on data from the radar module.

12. An object detection system for use in residential or commercial buildings, the system comprising:
 a. a camera having a first field of view, wherein the first field of view comprises an azimuth field of view and an elevation field of view, wherein the azimuth field of view is greater than the elevation field of view;
 a radar module vertically aligned with the camera, the radar module having radar antennas contained in the housing, the radar antennas having a second field of view and arranged in a formation including three radar transmission antennas of the radar antennas and four radar receiving antennas around each of the three radar transmission antennas;

c. computer memory; and
d. a processor in data communication with the camera, the radar module, the actuator, and the computer memory;
e. wherein the processor, using programming contained in the computer memory, causes the actuator to move the camera based on data from the module; and
f. wherein the processor the processor, using programming contained in the computer memory, performs a cross validation analysis using object detection events from the camera and the radar antenna that suppresses false positive results detected in the object detection events.

13. The system of claim 12, wherein the processor, using programming contained in the computer memory, validates the data from the radar module with data from the camera and outputs validated detection results.

* * * * *